Oct. 10, 1950 M. S. DUNKELBERGER 2,525,533
TRAP
Filed May 30, 1945 2 Sheets-Sheet 2
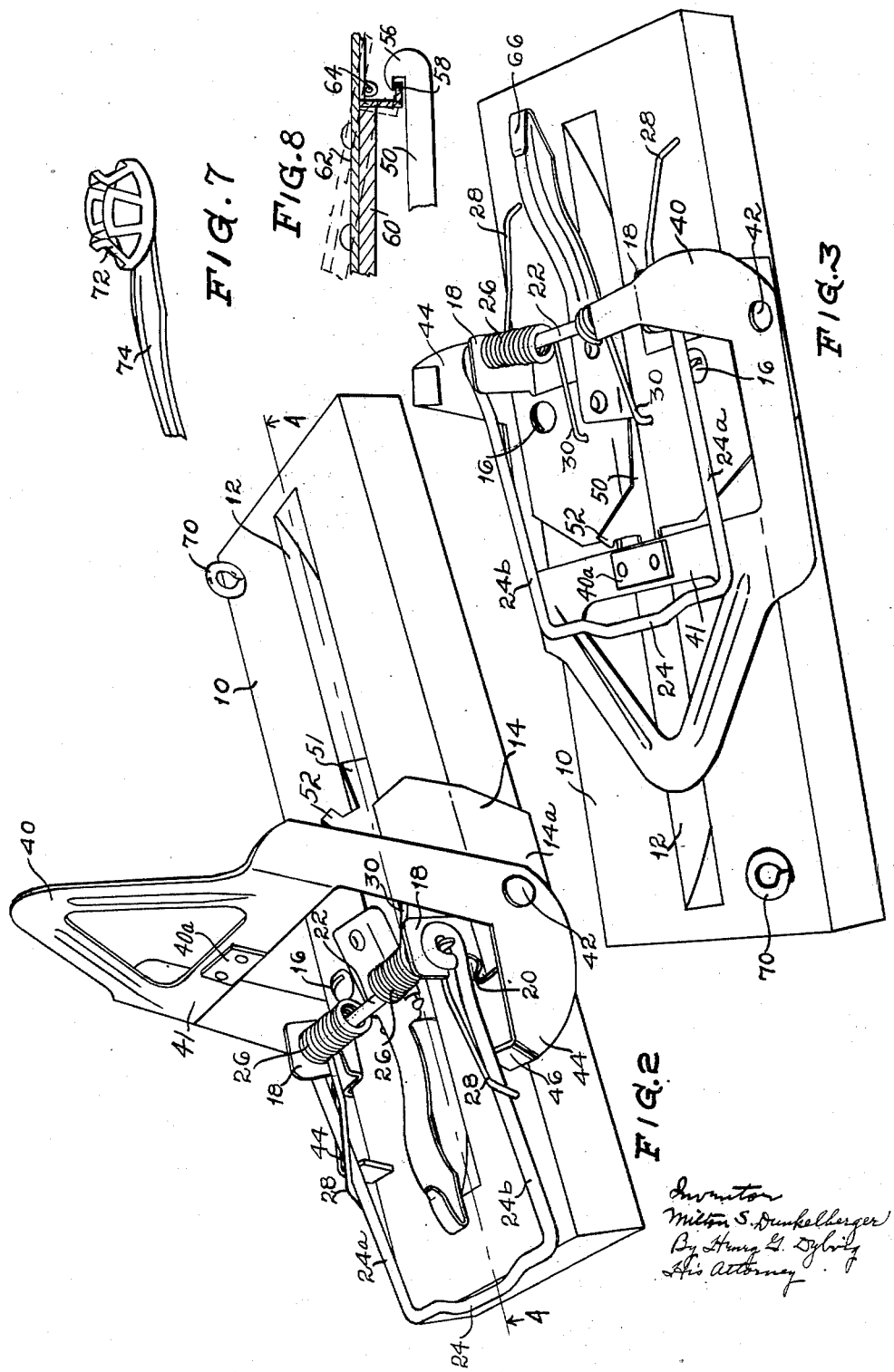

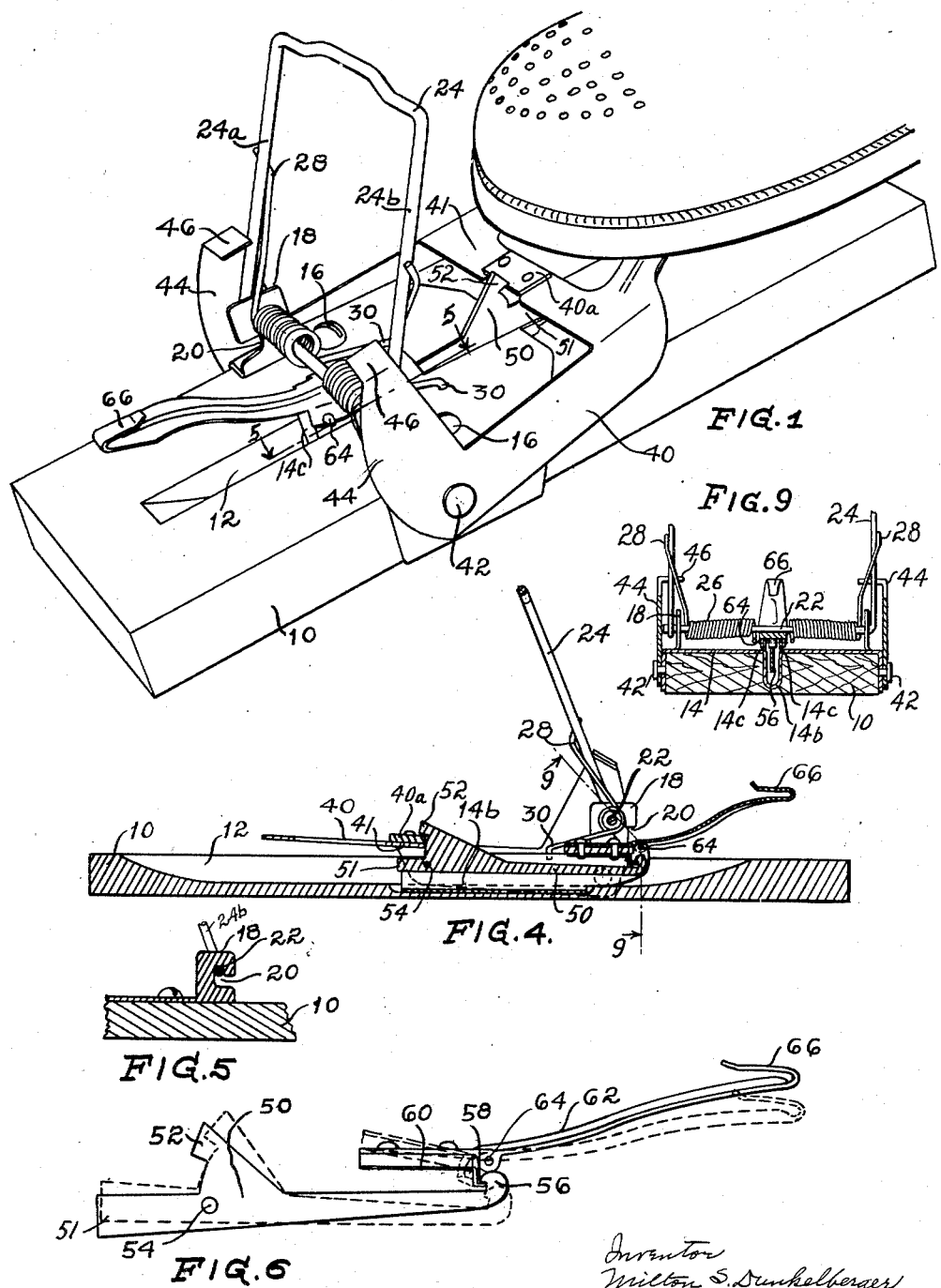

Patented Oct. 10, 1950

2,525,533

UNITED STATES PATENT OFFICE 2,525,533

TRAP

Milton S. Dunkelberger, Dayton, Ohio, assignor to The American Display Company, Dayton, Ohio, a corporation of Ohio Application May 30, 1945, Serial No. 596,618

3 Claims. (Cl. 43—83.5)

This invention relates to an animal or a rodent trap and more particularly to a trap having a spring-urged jaw.

Spring-urged jaw traps that are adapted to be released so as to catch the animal when the catch or release lever is actuated have been used extensively; but are objectionable for catching game or other animals, in that it is necessary for the trapper to handle the trap manually in releasing the trapped animal and in resetting the trap.

An object of this invention is to provide a trap for game or other animals wherein the trapped animal may be released and the trap reset by the trapper pressing his foot upon a pedal.

Other objects and advantages reside in the construction of parts, the combination thereof and the mode of operation, as will become more apparent from the following description.

Referring to the drawings,

Figure 1 is a perspective view of a rat trap shown in the process of setting.

Figure 2 is a perspective view similar to Figure 1, showing the rat trap in the position it assumes after it has been tripped.

Figure 3 is another perspective view showing the rat trap in inoperative position and folded for shipment or storage.

Figure 4 is a longitudinal, cross sectional view of the rat trap taken substantially on the line 4—4 of Figure 2 before the trap has been set off.

Figure 5 is a fragmentary cross sectional view taken substantially on the line 5—5 of Figure 1.

Figure 6 is a detailed view of the trap setting and release mechanism.

Figure 7 is a basket for retaining the bait mounted upon the trap-releasing lever.

Figure 8 is an enlarged, fragmentary, cross sectional view of the trigger mechanism shown in Figure 6.

Figure 9 is a cross sectional view taken substantially on the line 9—9 of Figure 4.

In the drawings the reference character 10 indicates the base of the game or other animal trap. The base is provided with a channel-shaped groove 12 along the center thereof. A metallic plate member 14 is attached to the base by screws 16. Plate member 14 is provided with downwardly projecting flanges 14a and a channel portion 14b located in the groove 12. Member 14 is provided with a pair of upwardly disposed ears 18, one on either side of the channel. Each ear is provided with a hook-shaped slot 20 receiving a cross bar 22 of the trap member 24, having the leg portions 24a and 24b. This jaw member 24 is urged in a counterclockwise direction, as viewed in Figures 1 and 2, by a pair of helical springs 26. One end 28 of each spring 26 normally engages the leg portion 24a or 24b of the jaw member 24. The other end 30 of each spring 26 is positioned in a suitable aperture in the plate member 14. The operation of the jaw is similar to the operation of a number of animal traps now on the market.

After the springs and the jaw have been assembled into a composite assembly, the bar 22 is hooked underneath the hook-shaped slot 20 in the ears 18. This permits assembling of the jaws and the springs independently of the remaining structure of the trap, thereby lending itself to mass production or line assembly methods of manufacture.

The trap may be set without manually manipulating the movable part by a trigger latch mechanism, which will now be described. A pedal bracket member 40 is pivotally mounted at 42 to the flanges 14a of the plate member 14. Member 40 is provided with a pair of arms 44 provided with reentrant flange portions or ears 46 underlying the leg portions 24a and 24b of the jaws 24, so that by pressing the foot upon the pedal portion of member 40, member 40 is oscillated about the pivot 42 from the position shown in Figure 2 into the position shown in Figure 1, thereby setting the jaw 24 in trapping position. A tab-like member 40a reinforces the cross bar of member 40. The jaw is held in set position by a latch 50 provided with a pawl 52 engaging member 40a. Member 50 is pivoted at 54, as best seen in Figure 6, and is provided with a hooked end 56 engaging a flange 58 of member 60 riveted to the under side of a trigger or release member 62 pivoted at 64 and provided with a bait-engaging end 66. The pivots 54 and 64 are secured to the sides 14c of the channel portion 14b of member 14.

The trap is latched in the position shown in Figure 1 automatically upon the pedal 40 being actuated into the position shown in Figure 1. Member 50 is so balanced that upon being released, it oscillates from the full line position shown in Figure 6 to the dotted position. Member 62 is so balanced that upon being released from extraneous forces, it oscillates from the dotted position shown in Figure 6 into the full line position. Member 50 has been provided with an extension 51 that extends underneath the cross bar 41 of the pedal 40.

From the foregoing, it can readily be seen that when the pedal 40 is actuated into the position shown in Figure 1 the cross bar 41 oscillates member 50 from the dotted position shown in Figure 6 to the full line position of Figure 6. As the hook 56 moves upwardly, it engages the flange 58, momentarily oscillating member 62 from the full line position into the dot-dash position, until member 56 clears the flange 58, after which member 62 oscillates into the full line position shown in Figure 6, at which time the parts are latched and the trap has been set. As the foot is released from the pedal 40, the cross bar 41 moves into engagement with the detent or projection 52, which holds the trap in "set" position until member 62 is actuated into the "down" position to release the hook 56. The pivot 64 is located in close proximity to the flange 58. The pivot 54 is located in close proximity to the detent or projection 52. This results in a very effective leverage arrangement.

The game or animal to be trapped, upon attempting to eat the bait on the release member 62, may oscillate the release member downwardly slightly, so as to cause the flange 58 to release the hook 56, thereby permitting latch member 50 to oscillate about the pivot 54, so as to release the detent or projection 52, permitting the jaw 24 to spring into closed position, thereby catching the animal tampering with the bait.

After the animal has been caught, it is not necessary to manually manipulate the jaw 24 to release the animal. It is merely necessary to press the foot upon the pedal 40 to reset the trap, thereby releasing the animal that has been caught without touching the animal or without manually manipulating the trap jaw 24.

Referring to Figure 3, the ends 28 of the springs 26 have been released from the leg portions 24a and 24b. The jaw 24 is then free to drop into the folded position shown in Figure 3. When in this position the jaw 24 is then juxtaposed upon the pedal 40 to permit shipment and storage. By rotating the spring ends 28 in a counterclockwise direction, as viewed in Figure 3, and inserting the ends 28 underneath portions 24a and 24b, the jaw 24 is then urged in a clockwise direction in readiness to snap into closed position.

A suitable screw eye 70 may be used to secure the trap and to suspend the trap from a suitable hook or other suspending implement.

Instead of using a hooked bait-engaging end 66, a basket-like bait-supporting member 72 may be attached by a rivet or other suitable member to the end of a release lever 74, as clearly shown in Figure 7. This permits the dropping of the bait into the basket without manually touching the basket. Furthermore, by placing the bait in such a basket, it is not easily removed, thereby increasing the efficiency of the trap.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an animal trap assembly provided with a base having a longitudinally disposed groove and a jaw spring urged to snap against the base, the combination of pedal means provided with reentrant flange portions adapted to actuate the jaw against the spring to set the trap in trapping position, with releasable means projecting into the groove for engaging the pedal means to hold the trap in set position, said releasable means including a detent member adapted to engage the pedal means, said releasable means including an extension engaged by the pedal means to reset the trap, and a pivotally mounted releasing trigger adapted to releasably hold said latch member so that as the animal to be trapped actuates the trigger the jaw snaps into closed position.

2. In an animal trap assembly provided with a base having a longitudinally disposed groove and a jaw spring urged to snap against the base, the combination including pedal means provided with reentrant flange portions adapted to actuate the jaw against said spring from closed position to open position, a pivotally mounted detent member projecting into the groove for engaging the pedal means to hold the trap in set position, said detent member including an extension mounted in the path of the pedal means for resetting the detent member, and a pivotally mounted trap releasing lever for holding the detent member in engagement with the pedal means, the trap releasing lever releasing the detent member upon being manipulated to thereby release the jaw so as to permit the jaw to spring into closed position.

3. An animal trap assembly provided with a base having a longitudinally disposed groove and a jaw, spring urged to snap against the base, said jaw having a pair of side portions, the combination including a pedal bracket for setting the trap, said pedal bracket having a pair of arms provided with flanges engaging the side portions of the jaw, a pivotally mounted detent member projecting into the groove for engaging the pedal bracket to set the pedal bracket, said detent member including an extension positioned in the path of movement of the pedal bracket when moving into "set" position to actuate the detent member into trap-setting position, and a pivotally mounted pedal bracket releasing lever member, said detent member being engaged by the pivotally mounted pedal bracket releasing lever member, said lever member having one end adapted to support a bait, the pedal bracket releasing lever member releasing the detent member upon being manipulated to thereby release the jaw to permit the same to spring into closed position.

MILTON S. DUNKELBERGER.

REFERENCES CITED

The following references are of record in the file of this patent:

UNITED STATES PATENTS

| Number | Name | Date |
|---|---|---|
| 907,516 | May | Dec. 22, 1908 |
| 1,089,975 | Shaw | Mar. 10, 1914 |
| 1,250,022 | Ruby | Dec. 11, 1917 |
| 1,407,096 | Spencer | Feb. 21, 1922 |
| 1,998,419 | Fuchs | Apr. 16, 1935 |
| 2,159,483 | Huebener et al. | May 23, 1939 |
| 2,263,560 | Barrows | Nov. 25, 1941 |
| 2,428,721 | Peterson | Oct. 7, 1947 |